Patented Apr. 27, 1943

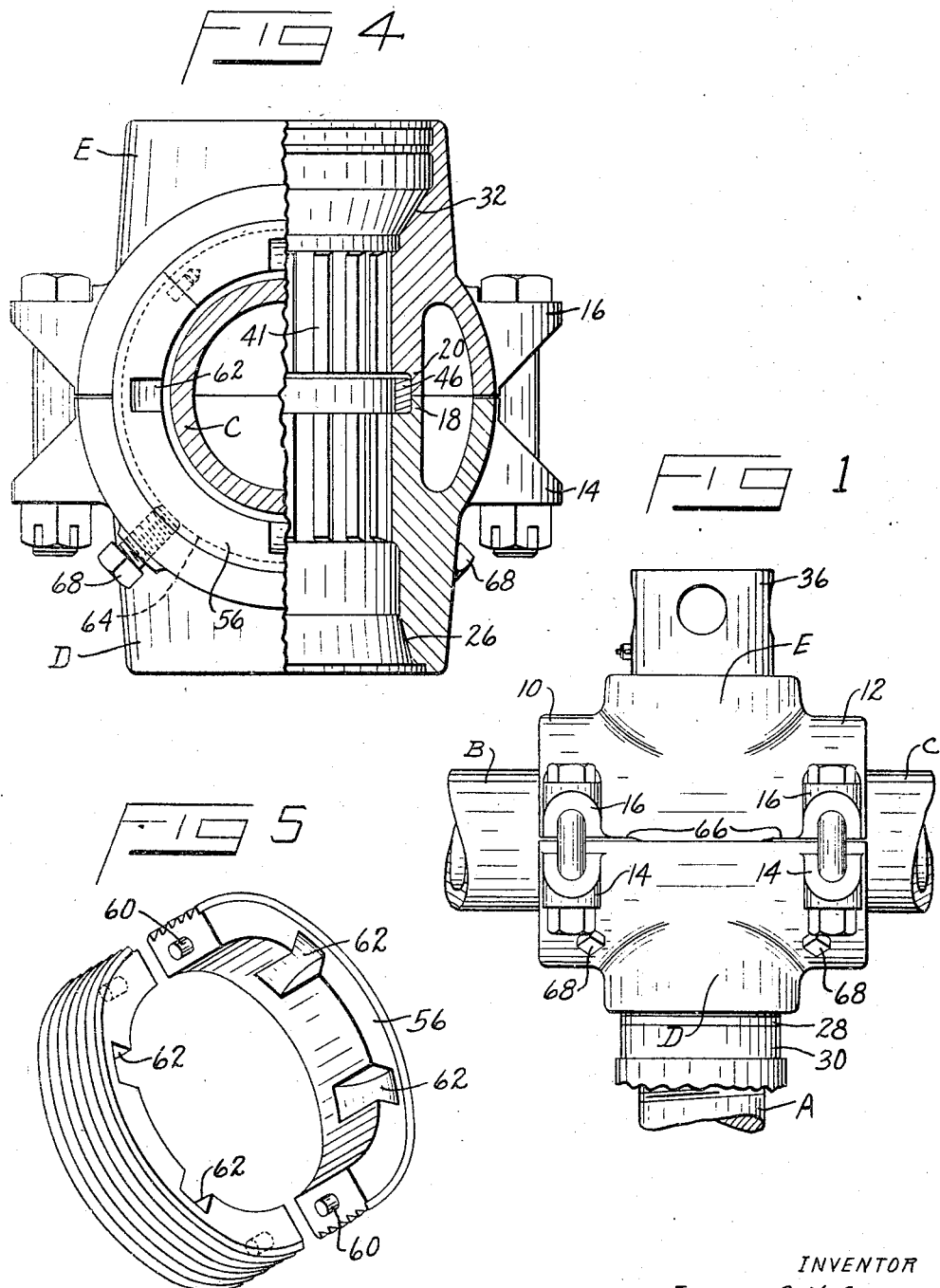

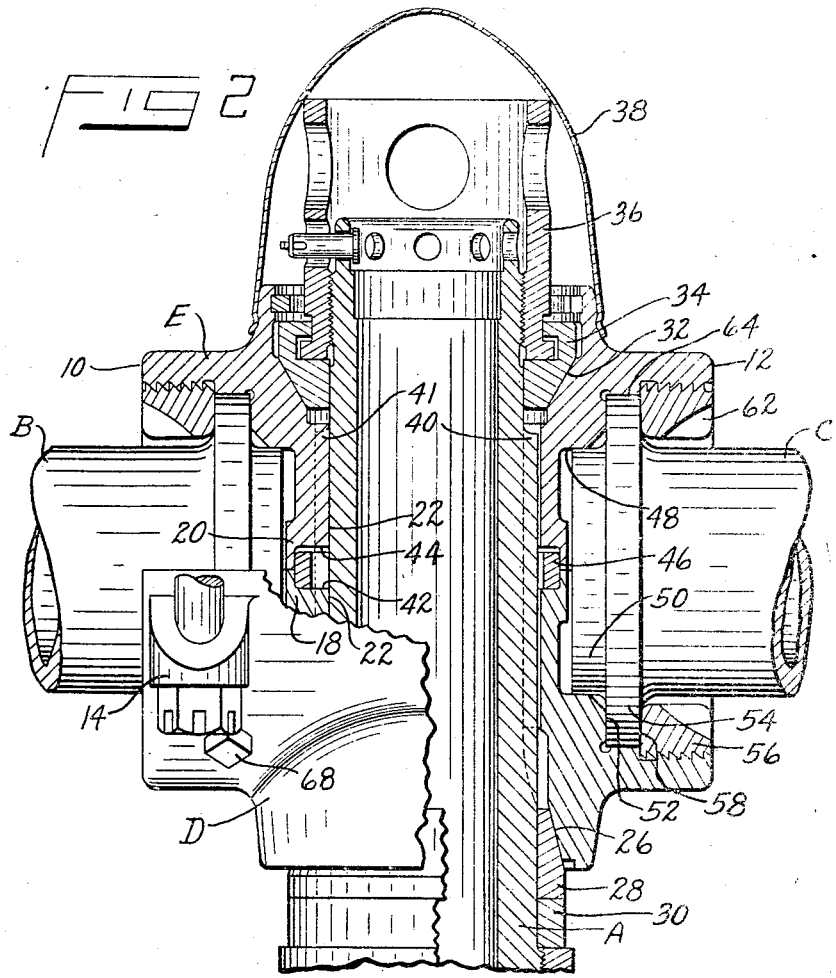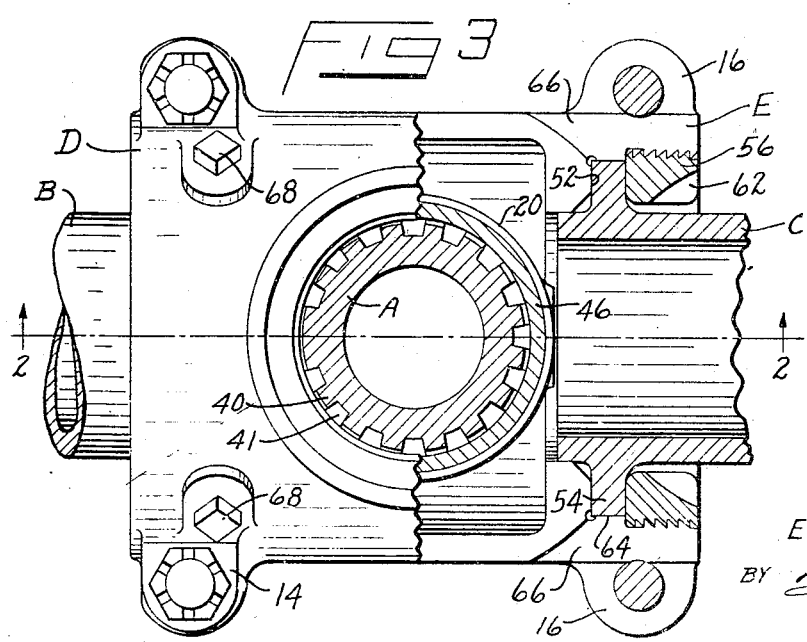

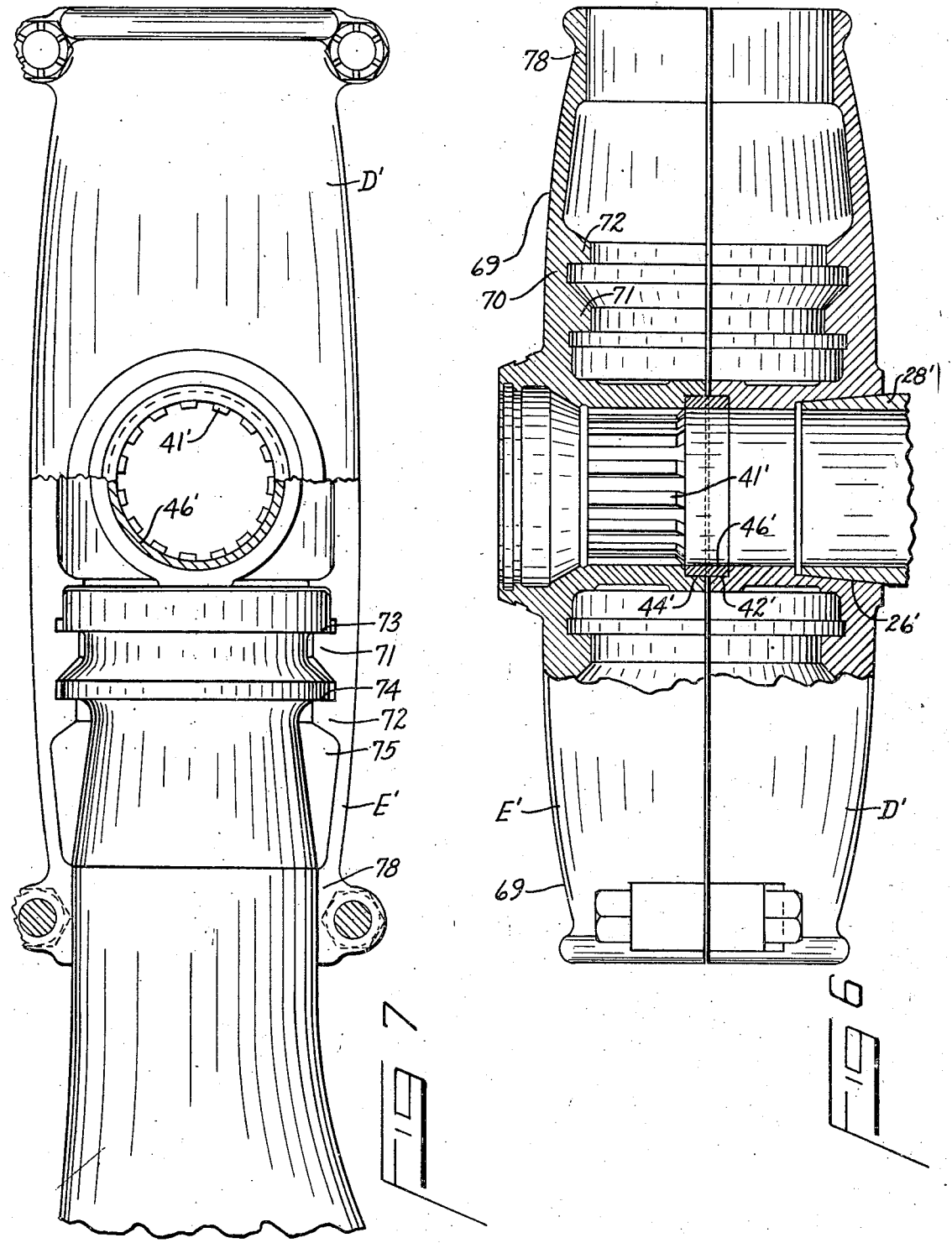

2,317,629

UNITED STATES PATENT OFFICE 2,317,629

AIRCRAFT PROPELLER HUB

Ernest G. McCauley, Dayton, Ohio

Application March 27, 1941, Serial No. 385,503

7 Claims. (Cl. 170—173)

This invention relates to improvements in aircraft propeller hubs and is particularly advantageous with propeller hubs of the split type.

It is regular practice to assemble the detachable blades in propeller hubs of the split type as a preliminary to balancing operations and final assembly on the engine shaft.

It is well known that the splined arbors used as a mount for the hub for this purpose do not generally furnish as close a fit with the halves of the hub as it is intended for them to have when mounted on the splined engine shaft.

Consequently, when split hubs of various types are assembled about the root ends of the blades while the hub is mounted on such an arbor, a relative shifting of the two halves of the hub takes place along the longitudinal axis of the sockets when tightening the clamping means at the blade socket ends. Because of this shifting, an unbalanced condition is always present in the assembled hub, even though the hub and blades are designed and constructed to be in static balance when assembled. Furthermore, this unbalanced condition may continue to occur after each attempt to balance the blade that involves an assembling of the blades in the hub. Also, this relative longitudinal displacement of the two halves will, when the same are clamped around the blades, result in having only one half of the hub shoulders bearing against the retaining flange or flanges at the root end of the propeller blade, thus causing one side of the blade flange to assume a greater portion of the load than the other side.

Furthermore, this relative displacement of the two halves of the hub throws the engine shaft housing portions of the two halves out of alignment, thereby preventing the proper centering of the hub on the shaft at both its front and rear ends. The hub is conventionally mounted on the engine shaft with a centering cone at each end. When the rear cone, being already on the engine shaft, is used to center the rear half of the hub with the shaft, then, the front half will be off-center with respect to the shaft and the front cone will not properly seat. Because of this condition, the front cone is forced into seating position by the tightening of the crankshaft retaining nut, thereby placing the cone and hub under an initial strain so that the cone becomes galled with relative slippage between it and the shaft and hub. This lack of proper seating of the front cone and failure to perform its centering function necessarily introduces still further unbalancing of the propeller as well as a strain on the engine shaft due to the angular mounting of the hub therewith caused by the off-center condition.

It is therefore the primary object of my invention to provide in a split type hub means to prevent the relative displacement of the hub halves in a direction transverse to the shaft axis during assembly with the blades.

It is a further object to construct means for the foregoing object which will serve for, and eliminate the use of, the special arbors or tools conventionally used heretofore for mounting the hub during such assembly.

The means for accomplishing the above said objects is conveniently made in the form of a dowel ring disposed in complemental recesses between the faces of the split members, said recesses being concentric with the inner circumference of the engine shaft housing. By constructing said dowel ring of a width slightly wider than the combined widths of the recesses, it may serve as a means for spacing the respective split hub members from each other, thereby obviating the need for making relief cuts at the open ends of the blade socket portions in order to obtain the desired clamping engagement of the socket with the blade shank.

It is a further object of my invention to provide a propeller hub with a novel socket portion and means of securing the blade in the socket at the prescribed distance from the axis of rotation, said novel socket portion having as advantages that it is easier and cheaper to construct and that the barrels or sockets are shorter in length with consequent desirable reduction in weight.

Heretofore where splined shaft and hub connections were employed for driving the propeller hub from the engine shaft the splines of the interconnected parts extended for a length substantially equal to the width of the hub so that torque load was taken substantially entirely by the interfitting splines and very little if any of this load was taken by the front and rear cones. The cones were employed merely to retain and center the hub on the shaft. Considerable difficulties arise from this type of construction due to the fact that there is present sufficient play between interfitting splines to permit a hammering effect therebetween, with the result that the splines eventually hammer down on the shaft and oftimes become broken. It has been observed that the spline portion at the rear end of the hub and shaft suffer most from this effect. In practice, it is noted that the wear and damage is generally confined to the first inch from the rear of the hub; thereby indicating that this portion of the spline connection is doing practically all the driving.

It is therefore an object of my invention to provide a propeller hub with a novel driving connection between the hub and the engine shaft. For this purpose, I provide means for driving the hub through different mediums at the front and rear. I provide a positive connection at the front end and a yielding friction or resilient engagement at the rear end. To do this, I employ a splined connection at the front end only, and at the rear end I use a long tapered cone made of a material that is relatively softer than that of either the engine shaft or hub. In this manner, I have succeeded in materially reducing the above said hammering effect.

In my new driving connection, it will be seen that the engine shaft first makes a yielding friction engagement with the cone at the rear, and then as the yielding progresses a positive driving connection is made between the splines at the front end. Because of a certain amount of relative torque between the shaft and hub, enabled by said yielding driving connection at the rear end, a slight angularity will exist between the splines on the shaft and those on the hub, and thereby, the load will be distributed over substantially all the splines. The yielding resilient engagement at the rear of the hub tends to dampen or absorb any oscillations due to the cyclical operation of the engine, or due to any changes in the power application or the load on the blade, thereby providing smoother operation of the propeller and reducing wear on the driving connection parts.

Other objects and advantages of my invention will appear in the following description and the accompanying drawings in which:

Figure 1 is an elevation view in reduced scale of the hub assembly shown in Figures 2, 3, and 4.

Figure 2 is a view partly in elevation and partly in section illustrating certain features of my invention. The section part is taken on the line 2—2 of Figure 3.

Figure 3 shows the same hub assembly in three-quarters elevation view looking in the direction of the shaft axis from the rear of the hub, wherein one-half end of the rear member of the hub has been broken away and the prop root portion is in section.

Figure 4 is an end view looking in the direction of the propeller socket showing one-half in elevation with the propeller root in section, and one-half in a section through the axis of the shaft housing with the engine shaft removed.

Figure 5 is a perspective view of the collar nut for securing the propeller blade in the socket.

Figure 6 is a side view of a hub showing a preferred modification of my invention and wherein parts are in section and parts are in elevation.

Figure 7 is a three-quarter view of the hub shown in Figure 6, looking from the rear, with one-half of the rear hub member broken away and with the propeller root end nestled in the socket so exposed.

Referring to the drawings, a two blade propeller hub illustrating my invention is shown in Figure 1 mounted on an engine drive shaft A with the propeller blades B and C mounted in the socket portions 10 and 12. The hub is preferably made of a metal of high tensile strength such as steel. It is made of a pair of complemental half members D and E which are clamped together into a unitary structure by means of bolts and nuts in cooperation with four pairs of complemental clamping lugs 14 and 16, formed integrally on each half member and located on each side and at each end.

The complemental halves D and E are illustrated in Figures 2 and 3 as being provided with inwardly presenting bosses 18 and 20 respectively, each having a bore 22 therein, said bosses forming when the members are joined together, a housing for the engine shaft. The halves are further shaped and formed so as to provide, as illustrated, the oppositely disposed socket portions 10 and 12 that project radially from the engine shaft housing axis, and are adapted for receiving in clamped relation in any adjusted pitch position, the root ends of detachable propeller blades B and C.

The shaft housing has a tapered or cone segment portion 26 at the rear end in the half member D for receiving an annular ring with tapered outer surface, herein called cone 28, which serves to center the hub on the engine shaft A, and which further serves in cooperation with a spacer 30 to limit the rearward movement of the hub and to fix the plane of rotation of the blades. The shaft housing on the half member E also has a tapered or cone segment portion 32 at the front end for receiving an annular ring with tapered outer surface, or cone 34, for centering the front end of the hub on the engine shaft and further serves in cooperation with retaining nut 36 that is threadedly engaged with the engine shaft, as the forward movement limiting means of the hub. A dust cap 38 is provided for protecting the cones and threads from dirt and foreign matter. Driving connection between the shaft and hub is made by means of interlocking splines 40 and 41 on the shaft and on the hub respectively.

Means for positively centering the two halves D and E about the engine shaft axis whether or not mounted on the engine shaft or a simulating arbor are provided as follows: Complemental annular recesses 42 and 44 are cut from the mating faces of bosses 18 and 20 with the circumference of the recesses being concentric with the inner circumference of the housing bores. Within these recesses is disposed an annular dowel ring 46 that preferably makes a press fit with the recess in one half and a close fit with the recess in the other half.

Since the dowel ring is common to, and concentric with, both halves, relative displacement of the two halves in any direction transverse to the shaft axis is prevented.

It is to be understood that my invention contemplates that the dowel effect may be obtained in a number of ways such as by placing suitable dowel pins in the hub boss constituting the engine shaft housing, or by reaming the bolt holes in the lugs 14 and 16 to close tolerances and using a close fitting bolt, provided, however, that the axes of the complemental bolt holes are equidistantly positioned from the axis of the hub. These latter dowelling methods provide a further advantage in that relative rotation of the two hub halves about the engine shaft axis is also prevented.

In accordance with my invention as shown in Figures 1 to 4, the blade is novelly secured in proper radial fixity to the hub by constructing the inner contour of the socket portion as follows: A recess 48 is made of a size for close fitting mating with a pilot portion 50 at the extreme root end of the blade. This recess fixes the longitudinal axis of the blade with respect to the hub. Then at a suitable space-distance from the base of recess 48 is provided an annular shoulder 52 which has a surface accurately ground or machined to a predetermined distance from the center axis of the hub housing or engine shaft. The propeller blade has at a predetermined uniform position on each blade, a flange 54 complemental to the shoulder in the socket and adapted to make close fitting engagement therewith. The socket is internally threaded as illustrated, for receiving a tightening collar or nut 56 adapted to engage the outer side 58 of the blade flange to firmly urge the flange against the shoulder 52. The nut 56 is best seen in Figure 5 wherein note that it is made in two halves that are mated together with dowel pins 60. The nut is made in two sections to enable installation on the propeller between the flange and the blade portion. It is provided with suitable notches 62 for engagement with a spanner wrench. A buttress type thread is preferable.

Thus, it is seen that the radial fixity of the blade is maintained by the inner socket shoulder 52 in cooperation with the blade flange 54 and the nut 56. It will also be appreciated that the shoulder in cooperation with the blade flange and nut provide lateral support of the blade for the radial width of the flange and that thereby an effective journalling of the blade is obtained that is equal to the length of the pilot portion plus the radial width of the flange. Still additional lateral support for the blade may be obtained by providing a close fit between the outer circumference 64 of the blade flange and the inner wall portion of the socket in which it is disposed. Because of this novel construction, sufficient lateral support for the propeller blade may be obtained with a much shorter socket than heretofore used, thereby saving weight and facilitating greater streamlining of design.

It will be understood that my novel means for securing and radial fixing of the blade is not limited to use with a split type hub, but it will be readily appreciated that the provision of my novel dowel means greatly facilitates the use of a threaded socket portion in a split type hub since it is extremely important that the half members must accurately match for the threads to match.

In assembly, the blades are placed between the two half-members and the bolts are placed in the lugs and the nuts tightened until the halves are held together firmly but not under stress at the relief portions 66. The collar nuts 56 are next assembled on the blade. The angular rotation of the blade is adjusted for pitch before tightening the collar nut. Because of the high friction exerted between the blade flange and the collar nut during the tightening process, means are provided to secure the blade against turning and consequent interference with the pitch adjustment during this process. For this purpose, set screws 68 are threaded through the socket wall so as to screw against the periphery of the flange on the blade as seen in Figure 4. Preferably, two set screws are used in each socket wall on the rear half of the hub, spaced as far apart as conveniently practical.

After the collar nuts 56 have been tightened against the blade flanges, the two halves of the hub are finally clamped tightly together, putting the outer ends of the socket under stress. The clamping not only clamps the barrel of the hub together, but likewise locks the collar nuts in position by the resiliency caused by the relief or recess 66 on the outer end of the inner face of one of the half members, and thereby prevents the collar nuts from becoming disengaged.

Now referring to Figures 6 and 7 of the drawings, the modification of my invention shown therein is of similar general construction to the previous modification, but differs in certain features to be now described. It has a dowel ring 46' for centering of the two halves D' and E' just as in the previous modification, but it is to be noted that the dowel ring in this case completely fills the recesses 42' and 44', and is of a width sufficient to slightly separate the two half-members D' and E', whereas in the previous modification, it did not space the hub half-members. In this modification, the ring serves the further function of a spacer between the two halves and thereby obviates the necessity of cutting off a relief portion on one of the half-members at each socket end in order to obtain better clamping action, as is conventionally done.

This modification is illustrated using my novel driving connection. Splines 41' are provided in the hub housing boss of the front half member only, although the engine shaft may have splines for either its entire length or only at the front half. At the outer end of the rear shaft housing is provided a conical section portion 26' of preferably greater length than the conventional conical section such as shown in Fig. 1. A conical shaped ring or bushing 28', preferably made of a material, such as bronze, of relative greater softness than either the hub housing or engine shaft, and of a suitable length corresponding to the conical section portion and complemental therewith, is employed. A transverse section cut is preferably made in the cone to facilitate yielding thereof. The length of the cone and corresponding conical portion of the housing is such that a good friction engagement may be made between the hub and shaft through this medium. A practical length is substantially that of the splines at the front end. This cone performs not only the conventional centering and rearward limiting functions, but further accomplishes the function of providing a relatively yieldable resilient friction engagement between the rear hub half and the engine shaft. In this way, a positive drive is obtained between the shaft and hub at the front end and a resilient yieldable drive is obtained at the rear end of the hub with the advantageous results pointed out in the statement of the objects of my invention.

It will be understood that this feature of my invention may be used with either a split or solid type hub, but that it is of especial value and has a cooperative result with the dowel means in improving the performance and assembling ease of the split type hub.

The modification of my invention shown in Figures 6 and 7 is still further improved over conventional hub design by the novel socket or barrel portion wall construction disclosed. It will be noted that the outer surface 69 of the socket portions have a curvature from their inner or hub and to their outer ends. This convergence serves to accomplish at least two novel results. It provides a streamlined appearance for the hub socket and it gives a truss or buttress support to the bending forces transmitted by the blade to the hub at the outer end of the socket.

Note also that the effective thickness of the socket wall 70 progressively converges from the hub shaft housing to the outer socket end, thereby providing a material strength at each point that is correlated to the lever moment of the bending or lateral force components being applied at the outer end of the socket.

The inner surface of the sockets are formed with cylindrical inwardly presenting shoulders 72 and 71 for engagement with corresponding flanges 73 and 74 on the root end of the propeller blade to fix the radial position of the blade in cooperation with the centrifugal force, as is according to conventional design practice.

In the conventional socket design, the wall outwardly of the last inwardly presenting shoulder (in this case 72) is sharply reduced in outer diameter thereby forming a more or less right angled wall portion which is subjected to a concentration of stresses resulting from the lateral or bending forces transmitted by the propeller to the housing socket. It is at this point that failures most often occur due to the fatigue of the metal occasioned by the flutter and weave of the blades. Because of my streamlined converging outer wall design, this right-angled wall portion is eliminated and the difficulty caused thereby is overcome.

As a further advantage of my novel wall construction in this respect, there is formed an annular recess 75 in the inner surface between the outermost shoulder 72 and the outer shank engaging portion 78 of the socket. After the propeller is assembled in position, suitable weighting material such as solder may be added to this recess to aid in the final balancing. The recess being annular and of substantially uniform width, is symmetrical. It is therefore possible to distribute the weighting material within the recess in any predetermined position to take care of both vertical and horizontal balance of the propeller. It will be obvious that since the hub is made in two halves, the final balancing of the propeller is greatly simplified by the use of the dowel ring which will prevent relative displacement between the halves during the clamping and tightening operation after the balance has been obtained. It will also be apparent that an adjustment of balance will not require the complete disassembling of the propeller nor disturbing the balance of any satisfactorily balanced blade assembled therein, but only the removal of one half of the hub for adding or removing of solder.

It is to be understood that my invention is not limited to the forms which are shown and the terms of description used herein, these being illustrative only, but that the invention contemplates such equivalents and modifications as may be included within the scope of the appended claims.

I claim:

1. In a propeller hub having a housing centrally thereof for receiving a driveshaft, a splined connection between said hub and said driveshaft only at the outer end of said hub and a relatively yielding fitting between said hub and shaft at the inner end of said hub, said fitting being adapted to engage said hub to said shaft for effecting a yielding friction drive therebetween.

2. A hub for mounting propeller blades on a shaft, said hub comprising a pair of separable members having complemental portions forming a socket for receiving the propeller blade root end in clamped relation and complemental portions forming a driveshaft housing, grooves at one end of said housing on the inner circumference thereof for positive engagement with complemental splines on said shaft and serving as a direct driving connection between said shaft and said housing, and a relatively yielding fitting between said shaft and said housing at the other end of said housing, said fitting being adapted to engage said housing to said shaft for effecting a yielding direct drive therebetween.

3. A hub for mounting propeller blades on a shaft, said hub comprising a pair of separable members having radially projecting socket portions for receiving the shanks of the propeller blades in clamped relation and having opposing inwardly projecting bosses with complemental bores therein to form a housing for a driveshaft, the bore of the boss on the outer member having grooves for positive engagement with complemental splines on the driving shaft, the other of said bosses having an inwardly converging conical opening, and a cone of relatively resilient material seated in said opening and serving to centralize the driveshaft therein, said cone being adapted to engage a sufficient portion of said opening and shaft surfaces to provide an effective driving connection.

4. A hub for mounting propeller blades on a shaft, said hub comprising a pair of separable members having complemental portions forming a socket for receiving the propeller blade root end in clamped relation and complemental portions forming a driveshaft housing, dowel means for preventing relative displacement between said members in a direction transverse to the shaft axis, grooves at one end of said housing on the inner circumference thereof for positive engagement with complemental splines on said shaft and serving as a direct driving connection between said shaft and said housing, and a relatively yielding fitting between said shaft and said housing at the other end of said housing, said fitting being adapted to engage said housing to said shaft for effecting a yielding direct drive therebetween.

5. A propeller hub of the type comprising a pair of separable members that complementally provide a socket portion for receiving a detachable propeller blade, said blade having a pilot portion at the root end thereof and having radially extending flange predeterminedly spaced from said root end, said socket portion having an inner bearing surface for complementally engaging said pilot portion in centered aligned relation and having an outwardly presenting annular shoulder surface predeterminedly spaced from the axis of rotation of said hub for abutting engagement with said blade flange, a split nut having threaded engagement with the outer end of said socket portion for tightly securing said blade flange against said shoulder to hold said blade in predetermined radial fixity with respect to said hub center, and dowel means for preventing radial displacement between, but enabling angular displacement of, said members with respect to the axis of rotation of said hub.

6. A propeller hub of the type comprising a pair of separable members that complementally provide a housing for a driveshaft and a socket portion for receiving a detachable propeller blade, said blade having a pilot portion at the root end thereof and having a radially extending flange predeterminedly spaced from said root end, said socket portion having an inner bearing surface for complementally engaging said pilot portion in centered aligned relation and having an outwardly presenting annular shoulder surface predeterminedly spaced from the axis of rotation of said hub for abutting engagement with said blade flange, a nut having threaded engagement with the outer end of said socket portion for tightly securing said blade flange against said shoulder to hold said blade in predetermined radial fixity with respect to said hub center, dowel means for preventing relative displacement between said members in the plane of their complemental faces, grooves at one end of said housing on the inner circumference thereof for positive engagement with complemental splines on said shaft and serving as a direct driving connection between said shaft and said housing, and a relatively yielding fitting between said shaft and said housing at the other end of said housing, said fitting being adapted to engage said housing to said shaft for effecting a yielding direct drive therebetween.

7. A propeller hub of the type comprising a pair of separable members that complementally provide a housing for a driveshaft and a socket portion for receiving a detachable propeller blade, said blade having a pilot portion at the root end thereof and having a radially extending flange predeterminedly spaced from said root end, said socket portion having a wall with outer surface progressively converging from the hub toward its open end in a substantially streamlined contour, having an effective wall thickness decreasing from the hub outwardly, and having an inner bearing surface for complementally engaging said pilot portion in centered aligned relation and having an outwardly presenting annular shoulder surface predeterminedly spaced from the axis of rotation of said hub for abutting engagement with said blade flange, a nut having threaded engagement with the outer end of said socket portion for tightly securing said blade flange against said shoulder to hold said blade in predetermined radial fixity with respect to said hub center, screw bolts in said socket wall for frictionally engaging the periphery of said blade to hold same fixed in predetermined adjusted position during the tightening of said nut, dowel means for preventing relative displacement between said members in the plane of their complemental faces, grooves at one end of said housing on the inner circumference thereof for positive engagement with complemental splines on said shaft and serving as a direct driving connection between said shaft and said housing, and a relatively yielding fitting between said shaft and said housing at the other end of said housing, said fitting being adapted to engage said housing to said shaft for effecting a yielding direct drive therebetween.

ERNEST G. McCAULEY.